| (12) | United States Patent | (10) Patent No.: | US 9,143,692 B2 |
|---|---|---|---|
| | Hayashi | (45) Date of Patent: | Sep. 22, 2015 |

(54) IMAGING APPARATUS WHICH PERFORMS DEVELOPMENT PROCESSING ON CAPTURED IMAGE

(71) Applicant: CASIO COMPUTER CO., LTD., Shibuya-ku, Tokyo (JP)

(72) Inventor: Tetsuya Hayashi, Hanno (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

(21) Appl. No.: 14/156,065

(22) Filed: Jan. 15, 2014

(65) Prior Publication Data

US 2014/0204243 A1 Jul. 24, 2014

(30) Foreign Application Priority Data

Jan. 24, 2013 (JP) .................. 2013-010785

(51) Int. Cl.
*H04N 5/232* (2006.01)
*H04N 9/79* (2006.01)
*H04N 5/77* (2006.01)

(52) U.S. Cl.
CPC .......... *H04N 5/23293* (2013.01); *H04N 5/772* (2013.01); *H04N 9/79* (2013.01)

(58) Field of Classification Search
CPC ................... H04N 5/2621; H04N 5/23293
USPC ....................................... 348/333.02, 333.05
See application file for complete search history.

(56) References Cited

U.S. PATENT DOCUMENTS

| 6,415,102 B1 * | 7/2002 | Fujii et al. ................ 386/210 |
|---|---|---|
| 8,111,314 B2 * | 2/2012 | Lee et al. ................ 348/333.02 |
| 8,149,313 B2 | 4/2012 | Watanabe et al. |
| 8,189,087 B2 | 5/2012 | Misawa et al. |

(Continued)

FOREIGN PATENT DOCUMENTS

| JP | 2000236460 A | 8/2000 |
|---|---|---|
| JP | 2001-117163 A | 4/2001 |

(Continued)

OTHER PUBLICATIONS

Japanese Office Action dated Dec. 24, 2014, issued in counterpart Japanese Application No. 2013-010785.
Korean Office Action dated Apr. 8, 2015, issued in counterpart Korean Application No. 10-2014-0008315.

*Primary Examiner* — Anthony J Daniels
(74) *Attorney, Agent, or Firm* — Holtz, Holtz, Goodman & Chick PC

(57) ABSTRACT

In an imaging apparatus of the present invention, when an instruction to perform image capturing is made during a monitoring operation of waiting for an image capture instruction while causing a live view image to be displayed, development processing for generating a recording image for recording from a RAW image captured by an image pickup element is started, and continuously performed concurrently with the monitoring operation. Then, after the development processing performed concurrently with the monitoring operation is completed, the recording image obtained by the development processing is recorded. Also, when the monitoring operation is being performed, the processing status of the development processing being performed is judged, and the judged processing status of the development processing is displayed together with the live view image while the monitoring operation is being performed.

18 Claims, 15 Drawing Sheets

(56) References Cited

U.S. PATENT DOCUMENTS

| | | | |
|---|---|---|---|
| 2004/0227823 A1* | 11/2004 | Shimizu | 348/223.1 |
| 2009/0237547 A1 | 9/2009 | Misawa et al. | |
| 2009/0295945 A1 | 12/2009 | Watanabe et al. | |
| 2012/0075412 A1* | 3/2012 | Miyamoto et al. | 348/36 |
| 2012/0218453 A1 | 8/2012 | Hosokawa | |
| 2012/0274831 A1* | 11/2012 | Kobayashi et al. | 348/333.05 |
| 2013/0202154 A1* | 8/2013 | Hirano | 382/103 |
| 2014/0063316 A1* | 3/2014 | Lee et al. | 348/333.02 |

FOREIGN PATENT DOCUMENTS

| | | |
|---|---|---|
| JP | 2008-236396 A | 10/2008 |
| JP | 2009225280 A | 10/2009 |
| JP | 2010-288030 A | 12/2010 |
| KR | 1020090125716 A | 12/2009 |
| WO | 2011052457 A1 | 5/2011 |

* cited by examiner

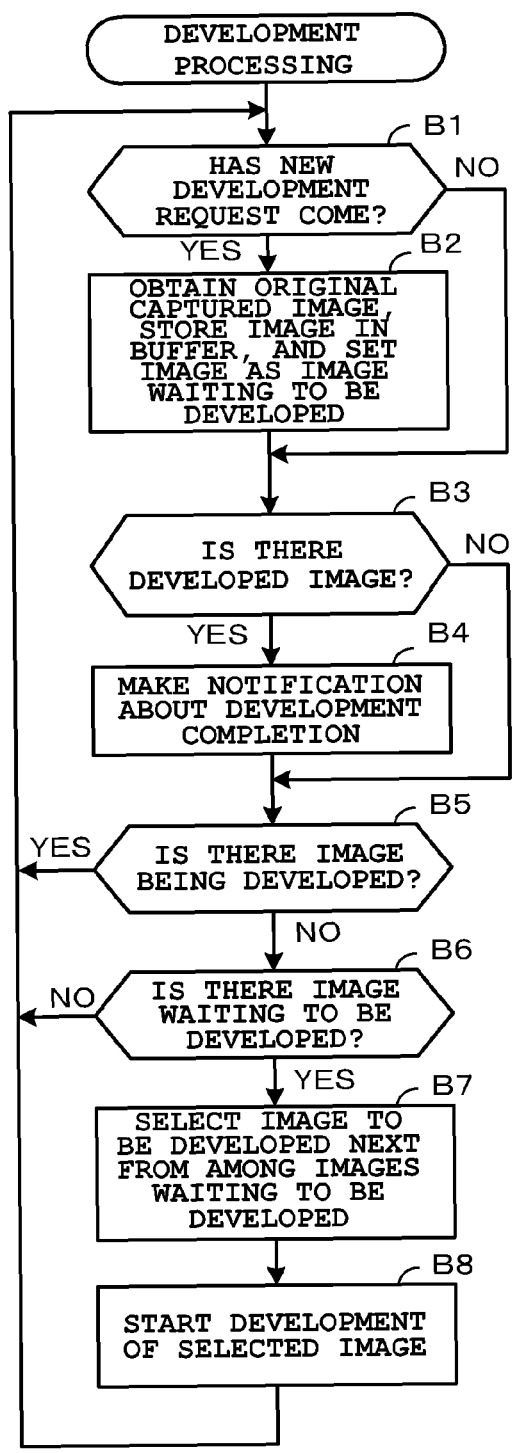

DEVELOPMENT-COMPLETE IMAGE

REPLAY MODE

⇐ RETURN BUTTON

7 TOUCH DISPLAY SECTION (MONITOR SCREEN)

REPLAY MODE

PERFORMING DEVELOPMENT/ WAITING FOR DEVELOPMENT

⇓ DEVELOPMENT COMPLETION NOTIFICATION

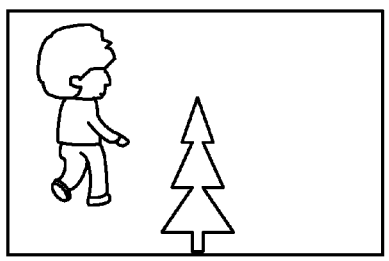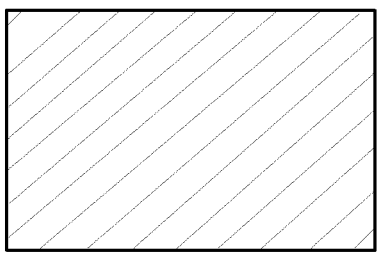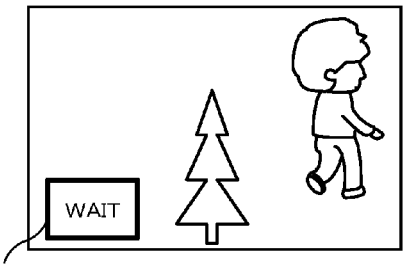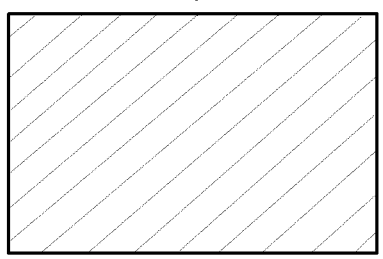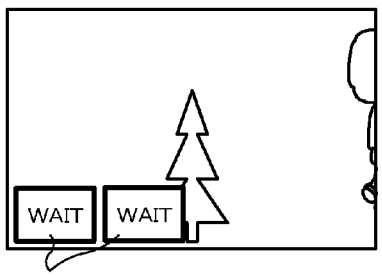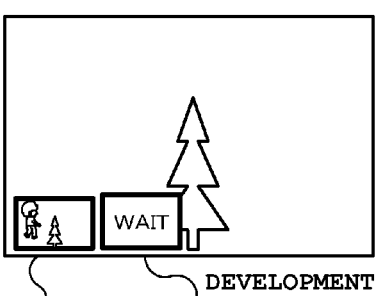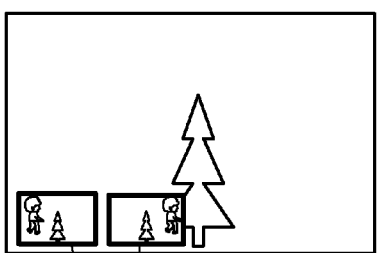

IMAGING APPARATUS WHICH PERFORMS DEVELOPMENT PROCESSING ON CAPTURED IMAGE

CROSS-REFERENCE TO RELATED APPLICATION

This application is based upon and claims the benefit of priority from the prior Japanese Patent Application No. 2013-010785, filed Jan. 24, 2013, the entire contents of which are incorporated herein by reference.

BACKGROUND OF THE INVENTION

1. Field of the Invention

The present invention relates to an imaging apparatus, an imaging method, and a program for performing development processing in response to an image capture instruction.

2. Description of the Related Art

In general, when an image capture instruction is made in a digital camera (imaging apparatus), an image captured by the imaging section is temporarily stored in the buffer memory as a RAW (Bayer pattern) image. This RAW image in the buffer memory is data that has not been subjected to development processing. On this RAW image, the imaging apparatus performs development processing, such as data interpolation (demosaicing), color conversion, and adjustment of white balance and sharpness, converts its file format to a standard file format, and records and stores it in a recording medium, after which next image capture becomes possible. Here, some imaging apparatuses have a function for automatically displaying an image generated by this development processing so that the user can check the image (such as a preview function or a REC view function).

As imaging apparatuses become multifunctional, the speed of a function for performing special development processing for providing a special effect to a captured image, which is different from normal development processing, and the speed of a continuous capture function such as a continuous exposure function are being increased. However, because this special development processing takes a long processing time, it is difficult to increase the speed of this special development processing together with the speed of the continuous capture function.

In order to reduce loads on imaging apparatus due to this special development processing, a technology has been proposed in which RAW data is transmitted from a camera to a service server via a wireless access point and the Internet, and the data subjected to development processing at this service server is received, recorded, and stored by the camera (for example, refer to Japanese Patent Application Laid-Open (Kokai) Publication No. 2008-236396).

SUMMARY OF THE INVENTION

In accordance with one aspect of the present invention, there is provided an imaging apparatus comprising: a monitoring section which performs a monitoring operation of waiting for an image capture instruction while causing a live view image to be displayed; a development section which starts development processing for generating a recording image for recording from a RAW image captured by an image pickup element when an instruction to perform image capturing is made while the monitoring operation is being performed, and continuously performs the development processing concurrently with the monitoring operation; a recording section which records the recording image obtained by the development processing after the development processing performed by the development section concurrently with the monitoring operation is completed; a judgment section which judges processing status of the development processing being performed by the development section while the monitoring operation is being performed; and a display control section which causes the processing status of the development processing judged by the judgment section to be displayed together with the live view image while the monitoring operation is being performed.

In accordance with another aspect of the present invention, there is provided an imaging method comprising: a step of performing a monitoring operation of waiting for an image capture instruction while causing a live view image to be displayed; a step of starting development processing for generating a recording image for recording from a RAW image captured by an image pickup element when an instruction to perform image capturing is made while the monitoring operation is being performed, and continuously performing the development processing concurrently with the monitoring operation; a step of recording the recording image obtained by the development processing after the development processing performed concurrently with the monitoring operation is completed; a step of judging processing status of the development processing being performed while the monitoring operation is being performed; and a step of causing the judged processing status of the development processing to be displayed together with the live view image while the monitoring operation is being performed.

In accordance with another aspect of the present invention, there is provided a non-transitory computer-readable storage medium having stored thereon a program that is executable by a computer, the program being executable by the computer to perform functions comprising: monitoring processing for performing a monitoring operation of waiting for an image capture instruction while causing a live view image to be displayed; development control processing for starting development processing for generating a recording image for recording from a RAW image captured by an image pickup element when an instruction to perform image capturing is made while the monitoring operation is being performed, and continuously performing the development processing concurrently with the monitoring operation; recording processing for recording the recording image obtained by the development processing after the development processing performed by the development control processing concurrently with the monitoring operation is completed; judgment processing for judging processing status of the development processing being performed by the development control processing while the monitoring operation is being performed; and display control processing for causing the processing status of the development processing judged by the judgment processing to be displayed together with the live view image while the monitoring operation is being performed.

The above and further objects and novel features of the present invention will more fully appear from the following detailed description when the same is read in conjunction with the accompanying drawings. It is to be expressly understood, however, that the drawings are for the purpose of illustration only and are not intended as a definition of the limits of the invention.

BRIEF DESCRIPTION OF THE DRAWINGS

FIG. 4 is a flowchart of an operation of a development processing section 6;

FIG. 5A to FIG. 5D are diagrams showing in time series the display contents of a monitor screen where a live view image is displayed which are changed according to a development processing status and the like;

FIG. 8A to FIG. 8G are diagrams showing the display contents of a monitor screen in time series in a second embodiment;

DETAILED DESCRIPTION OF THE PREFERRED EMBODIMENTS

Embodiments of the present invention are described in detail below with reference to the drawings.

First Embodiment

First, a first embodiment of the present invention is described with reference to FIG. 1 to FIG. 4, FIG. 5A to FIG. 5D, FIG. 6A and FIG. 6B, and FIG. 7A and FIG. 7B.

Figure 1:
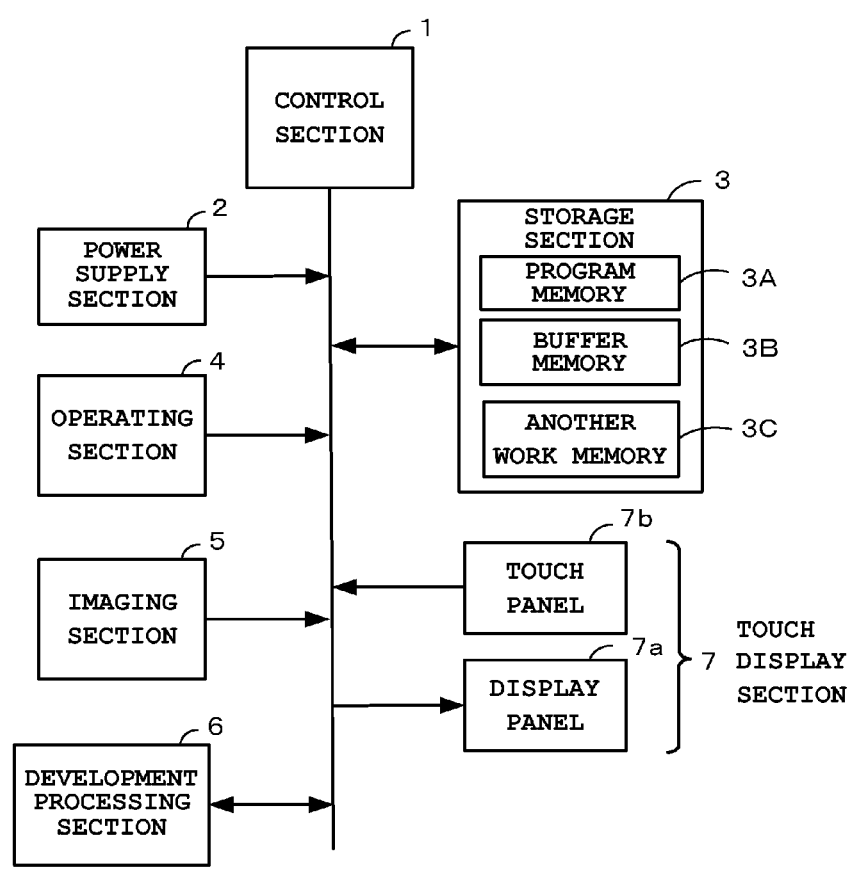
FIG. 1 is a block diagram showing basic components of a digital camera in which the present invention has been applied as an imaging apparatus.

FIG. 1 is a block diagram showing basic components of a digital camera in which the present invention has been applied as an imaging apparatus. This digital camera is a compact camera that has, for example, a basic imaging function, a continuous capturing function (continuous shooting function), a clock function, and a development function for performing development processing for developing a captured image, and is capable of capturing moving images in addition to still images.

A control section 1 in FIG. 1 operates with power supplied from a power supply section (a secondary battery) 2, and controls the entire operation of the digital camera according to various programs in a storage section 3. This control section 1 is provided with a CPU (Central Processing Unit), a memory, and the like not shown. The storage section 3 is structured to include, for example, a ROM (Read Only Memory) and a flash memory, and has a program memory 3A having stored therein a program for achieving the present embodiment according to an operation procedure shown in FIG. 3 and FIG. 4 described further below, various applications, etc.

Also, the storage section 3 includes a buffer memory 3B that has a plurality of (in the present embodiment, five) buffers and temporarily stores captured image data, and another work memory 3C that temporarily stores various information (for example, a flag) required to operate the camera. This storage section 3 may be structured to include, for example, a removable portable memory (recording medium) such as an SD (Secure Digital) card or an IC (Integrated Circuit) card, or may be structured to include, although not shown, a storage area on a predetermined server apparatus side in a case where the camera is connected to a network by a communication function.

An operating section 4 in FIG. 1 includes, although not shown, a mode change button for switching between an operation mode in which image capturing can be performed (capture mode) and an operation mode for replaying a captured image (stored image) (replay mode), a release button for instructing to start image capturing, and various press-button-type keys for performing an operation of setting an image capture condition such as exposure and a shutter speed and an image selecting operation for selecting a replay target. As processing to be performed in response to an input operation signal from this operating section 4, the control section 1 performs, for example, mode change processing, image capture processing, capture condition setting processing, and image selection processing.

Figure 2:
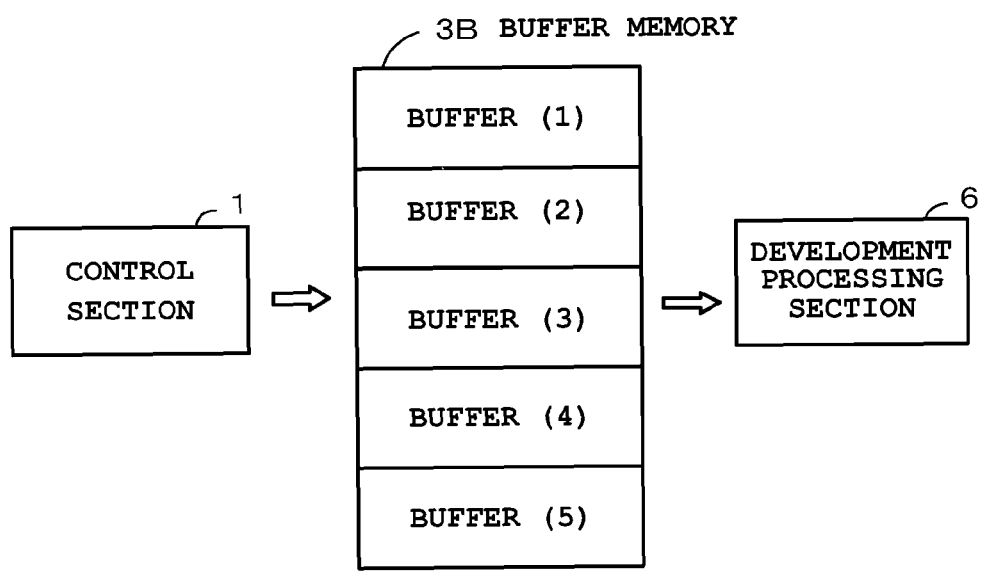
FIG. 2 is a diagram for describing a buffer memory 3B where a captured image is stored as a target for development processing.

An imaging section 5 in FIG. 1 constitutes a camera section which can photograph a subject with high definition by a subject image from an optical lens being formed on an image pickup element such as a CCD (Charge-Coupled Device) or CMOS (Complementary Metal Oxide Semiconductor) omitted in the drawings. An image signal (analog signal) subjected to photoelectric conversion by the image pickup element is converted to digital data and temporarily stored as a RAW (Bayer pattern) image in the buffer memory 3B. The imaging section 5 can also perform autofocus processing (AF processing), exposure adjustment processing (AE processing), auto white balance adjustment processing (AWB), image compression processing, image restore processing, and the like under the control of the control section 1. The RAW image is, for example, formed of data represented by 12 bits (4096-level gray scale), and is temporarily stored in a vacant buffer from among the five buffers (1) to (5) included in the buffer memory 3B, as shown in FIG. 2.

On an image temporarily stored in the buffer memory 3B and waiting to be developed, or in other words, on a RAW image waiting to be developed, a development processing section 6 performs development processing, such as data interpolation (demosaicing), color conversion, and adjustment of white balance and sharpness. This development processing section 6 is structured to include a CPU and a memory where a development processing program and the like are stored, separately from the control section 1, and judges whether development processing has been completed for each image, as a development processing status. Also, when an arbitrary capture mode type is selected from among a plurality of capture mode types (for example, a nightscape mode and an art conversion mode) according to an image-capture scene, the development processing section 6 performs development processing of a type associated with that capture mode type. That is, in the present embodiment, plural types of development processing with processing contents suitable for the respective capture mode types are set, and development processing of a type associated with a selected capture mode type is performed from among the plural types of development processing. Here, in development processing corresponding to the nightscape mode, different brightness corrections and white balance adjustments are performed on a flash-reaching foreground portion where people or the like are present and a background portion to which a flash does not reach. In development processing corresponding to the art conversion mode, a captured image is converted to a painting-style image, or a dynamic range is widened by multiplex synthesis. That is, in these special types of development processing, in contrast to normal development processing where a subject status is attempted to be reproduced as it is, a special effect is further provided to a normal captured image, and it takes long time to perform processing compared with the normal development processing.

When a request for development is received from the control section 1, the development processing section 6 reads out a RAW image in the buffer memory 3B which is waiting to be developed, and performs development processing on this read out image. That is, in a state where a plurality of images waiting to be developed have been stored in the buffer memory 3B, when development processing currently being performed is completed, the development processing section 6 notifies the control section 1 that the development processing has been completed. Then, the development processing section 6 reads out an image that comes next in chronological capture order from among the plurality of images waiting to be developed in the buffer memory 3B, and performs development processing on this read out image. In the example of FIG. 2, the five buffers (1) to (5) have been arranged in chronological capture order.

When the above-described notification about the completion of development processing is received from the development processing section 6, the control section 1 obtains the developed image from the development processing section 6, generates a development-complete image indicating that the development processing has been completed, and causes this development-complete image to be synthesized and displayed with part of a live view image displayed on a touch display section 7. That is, the control section 1 reduces the developed image subjected to the development processing to a predetermined size, and causes the reduced image to be displayed on part of the live view image, as a development-complete image. Here, the animated motion of the development-complete image is controlled so that the development-complete image (still image) involves movement. For example, the development-complete image emerges by jumping up, and then stops and continues to be displayed until a predetermined time elapses. Then, after being subjected to compression processing or the like, the developed image is recorded and stored in the recording medium (for example, the SD card) of the storage section 3.

The touch display section 7 is structured to have a touch panel 7b laminated on a display panel 7a. The display panel 7a is a high-definition liquid crystal display or an organic EL (Electro Luminescence) display, and functions as a monitor screen for displaying a captured live view image or a replay screen for replaying a captured image. The touch panel 7b constitutes a touch screen which detects a point where a touch operation has been performed by a finger or the like of a user and inputs coordinate data of this point. Note that the touch operation herein is not limited to a contact operation and includes, as an operation similar to the contact operation, a non-contact operation for which the position of a finger or a pen is detected according to change in capacitance or brightness due to the approach or approaching movement of the finger or the pen.

Next, the operation concept of the digital camera in the first embodiment is described with reference to flowcharts shown in FIG. 3 and FIG. 4. Here, each function described in the flowcharts is stored in a readable program code format, and operations based on these program codes are sequentially performed. Also, operations based on the above-described program codes transmitted over a transmission medium such as a network can also be sequentially performed. That is, the unique operations of the present embodiment can be performed using programs and data supplied from an outside source over a transmission medium, in addition to a recording medium. This applies to other embodiments described later.

Figure 3:
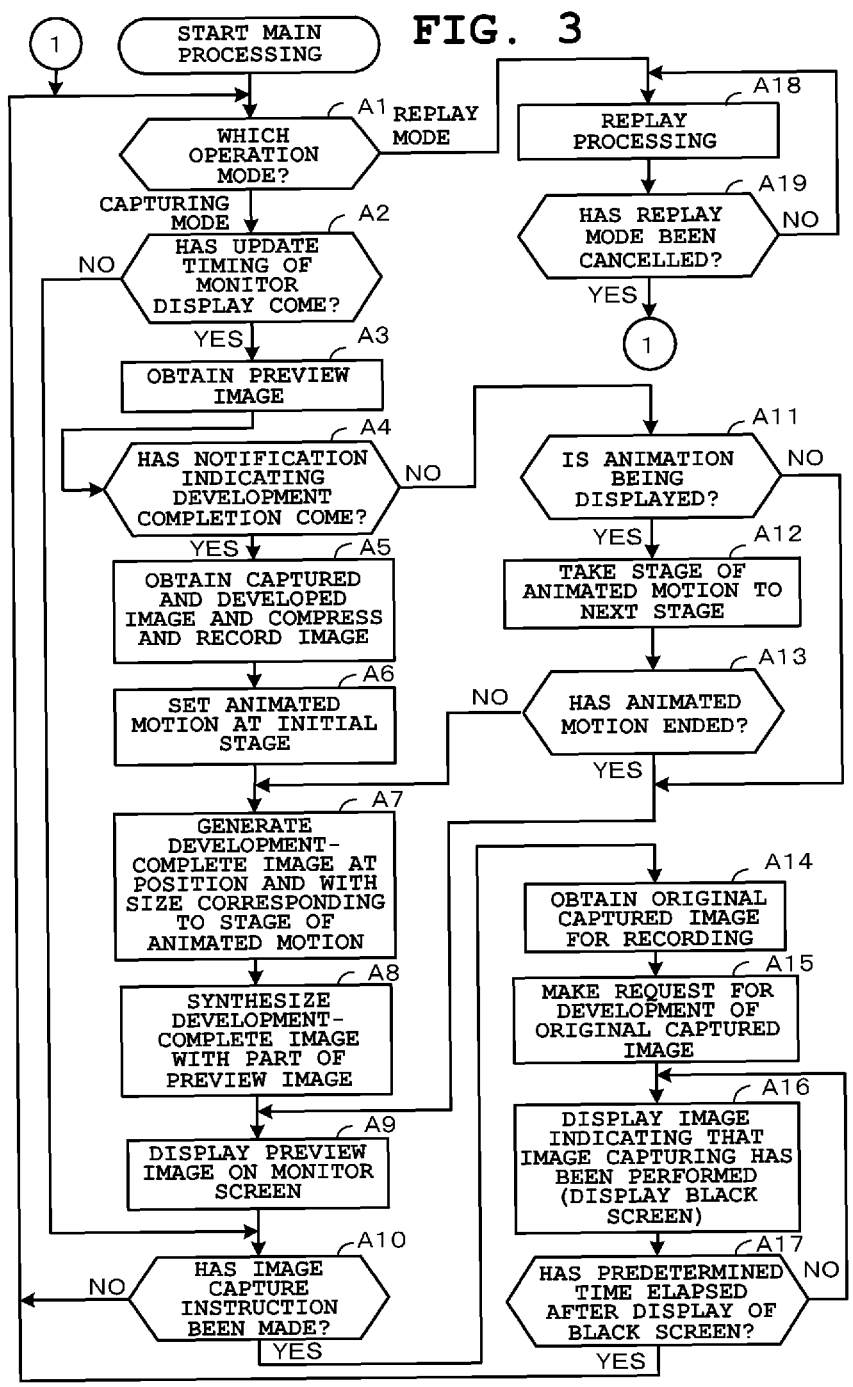
FIG. 3 is a flowchart outlining the operation of the characteristic portion in the entire operation (main processing) of the digital camera.

FIG. 3 is a flowchart outlining the operation of the characteristic portion in the entire operation (main processing) of the digital camera, which is started upon power-up.

First, the control section 1 performs, for example, initialization processing for clearing the memory or the like in response to a power-on operation, and then judges whether the current operation mode is a capture mode (Step A1). Then, because the present embodiment has a configuration where a current mode is set to be a capture mode immediately after power-up (the current mode is judged to be a capture mode at Step A1), the control section 1 judges whether the update timing of the monitor display has come, or in other words, judges whether timing for performing, at predetermined cycles, a monitoring operation of waiting for an image capture instruction while displaying a live view image has come (Step A2), and judges whether the release button of the operating section 4 has been operated so as to instruct to perform image capturing (Step A10). Here, the update cycle of the monitor display has been set at, for example, approximately 1/30 seconds in order to suppress screen flicker.

Figure 5A:
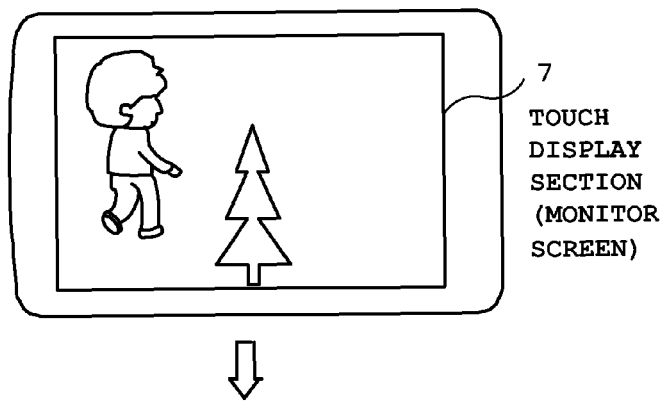

Here, when judged that the update timing of the monitor display has come (YES at Step A2), the control section 1 obtains a live view image from the image pickup element of the imaging section 5 (Step A3). Then, the control section 1 judges whether a notification about development completion has been received from the development processing section 6 (Step A4), and judges whether the animation of the development-complete image is being displayed (Step A11). Here, since it is immediately after power-up, the judgment results at Step A4 and Step A11 are NO, and therefore the control section 1 proceeds to Step A9 and causes the above-described live view image to be displayed on the monitor screen of the touch display section 7. As such, every time the update timing of the monitor display is detected to have come (YES at Step A2), the control section 1 performs an operation of updating the live view image and displaying it on the monitor. FIG. 5A to FIG. 5D are diagrams showing in time series the display contents of the monitor screen where a live view image is displayed which are changed according to a development processing status and the like. FIG. 5A shows a display example when an image of a subject (a walking child) is captured as a live view image.

Figure 5B:

Here, when the release button of the operating section 4 is operated so as to instruct to perform image capturing (YES at Step A10), the control section 1 obtains a captured image (original image) from the imaging section 5 for recording (Step A14), sends this captured image to the development processing section 6, and makes a request for development (Step A15). Then, the control section 1 causes a black screen to be displayed as an image indicating that image capturing has been performed (Step A16), and continues this black screen display until a predetermined time (for example, a second) elapses (Steps A16 and A17). Then, the control section 1 returns to the initial Step A1. FIG. 5B shows a monitor screen (black screen) immediately after image capturing. This display of the black screen is to indicate that image capturing has been performed, and serves as an alternative display during a period in which a preview image cannot be obtained or updated for the reason that the capture mode of the image pickup element is temporarily switched from a capture mode for capturing a preview image to a capture mode for capturing an actual image. Here, in place of the black screen, animation showing the opening and closing of a shutter curtain may be displayed. By this image capturing, the update of the live view image is temporarily suspended, but the monitoring operation is continuously maintained.

FIG. 4 is a flowchart of an operation of the development processing section 6.

First, the CPU of the development processing section 6 judges whether a new development request has been received from the control section 1 (Step B1). Then, when judged that a new development request has been received (YES at Step B1), the CPU causes an actual captured image for which the development request has been made to be stored in a vacant buffer in the buffer memory 3B shown in FIG. 2, as an image waiting to be developed (Step B2). Next, the CPU judges whether development processing currently being performed for one image has been completed (Step B3). When the development completion is detected (YES at Step B3), the CPU notifies the control section 1 of the development completion (Step B4). This development completion notification is made at timing at which development for one image is completed.

Next, the CPU proceeds to Step B5 to judge whether there is an image currently being developed (during development). Then, when judged that there is an image currently being developed (YES at Step B5), the CPU returns to the initial Step B1. Conversely, when judged that no image is being developed (NO at Step B5), the CPU judges whether there still remain images waiting to be developed in the buffer memory 3B (Step B6). Then, when judged that there is no image waiting to be developed (NO at Step B6), the CPU returns to the initial Step B1. Conversely, when judged that there still remain images waiting to be developed (YES at Step B6), the CPU selects an image that come first in chronological capture order as the next image to be developed (Step B7), and starts development processing on the selected image (Step B8).

In the present embodiment, since the plural types of development processing with processing contents suitable for the respective capture mode types have been set, the CPU starts development processing of a type according to a selected capture mode type, from among the plural types of development processing. Then, after starting the development processing as described above, the CPU returns to the initial Step B1, and thereafter repeats the above-described operations. Then, when the development processing of the type according to the capture mode type is completed, the CPU makes a notification about the development completion (Step B4). Here, a notification about the type of the development processing (for example, art conversion) performed according to the capture mode type is also made.

On the other hand, when the notification about the development completion is received from the development processing section 6 (YES at Step A4 of FIG. 3), the control section 1 obtains the developed image from the development processing section 6, performs compression processing and the like on the image, and causes the image to be recorded and stored in a recording medium (for example, the SD card) of the storage section 3 (Step A5). Then, the CPU proceeds to processing for generating a development-complete image indicating that the development processing has been completed, synthesizing it with part of the live view image, and continuously displaying this live view image with the development-complete image on the monitor screen for a predetermined time (Step A6 to Step A13). In this display processing, every time development processing is performed on one of the plurality of images in the buffer memory 3B which are waiting to be sequentially developed, a development-complete image for that image is displayed on the monitor screen. That is, the development-complete images herein are sequentially displayed one by one by switch display.

Specifically, after causing the animated motion of a development-complete image to be set at an initial stage (Step A6), the control section 1 generates a development-complete image at a display position and with a size corresponding to the stage of the current animated motion (Step A7), synthesizes this development-complete image with part of the live view image (Step A8), and displays this live view image including the development-complete image on the monitor screen (Step A9). Here, in a case where a new development-complete image is generated when the previous development-complete image is still being displayed, the development-complete image generated this time is displayed by switch display in place of the previous development-complete image. Next, the control section 1 judges whether an image capture instruction has been made (Step A10) and, when judged that an image capture instruction has not been made (NO at Step A10), returns to the initial Step A1.

When the development-complete image is synthesized with part of the live view image and displayed on the monitor screen as described above, the control section 1 judges at Step A11 that animation is being displayed, and after proceeding to Step A12, takes the stage of the animated motion to the next stage. Hereafter, until the timing of the end of the animated motion is detected (NO at Step A13), the control section 1 repeats, after returning to Step A7 described above, processing for generating a development-complete image at a display position and with a size corresponding to the stage of the current animated motion, synthesizing this development-complete image with part of the live view image (Step A8), and displaying this live view image including the development-complete image on the monitor screen (Step A9). In this embodiment where the type of development processing is included in a development completion notification as described above, a character string indicating the type of the development processing (for example, art conversion) is displayed near the development-complete image. Note that the type of development processing herein is not limited to be displayed as a character string, and may be displayed in a manner to be identifiable by color or graphics. Also, the display position thereof may be arbitrarily determined.

Figure 6A:
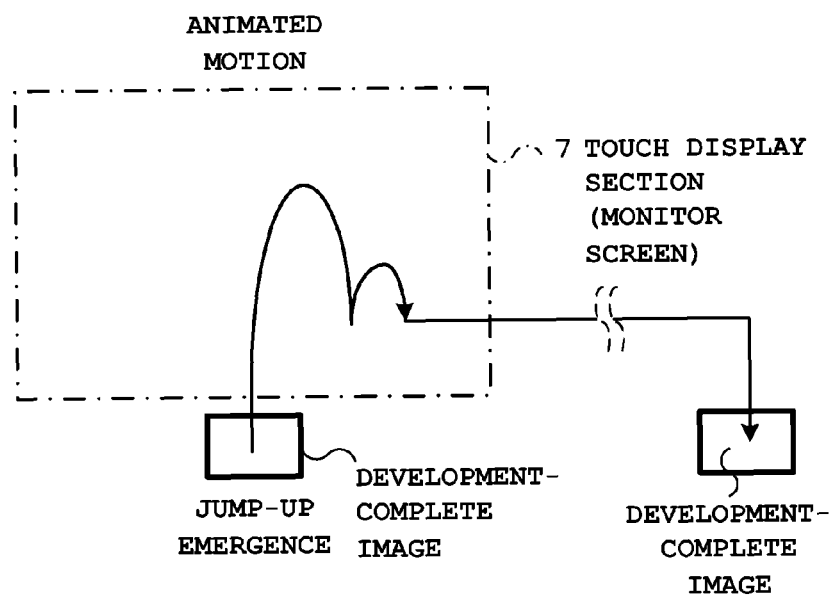
FIG. 6A and FIG. 6B are diagrams for describing an animated motion of a developed image.

FIG. 6A is a diagram for describing an animated motion of a development-complete image.

First, the control section 1 reduces an actual captured image for recording to a predetermined size (for example, approximately $\frac{1}{16}$ size), and then causes the reduced image (development-complete image) to be emerged with animated motion such that it jumps up from a lower portion of the monitor screen. Specifically, the development-complete image is caused to emerge with animated motion such that it first jumps up to draw a large mountain (convex parabola), and then continuously jumps up to draw small mountains (convex parabola).

Figure 5C:
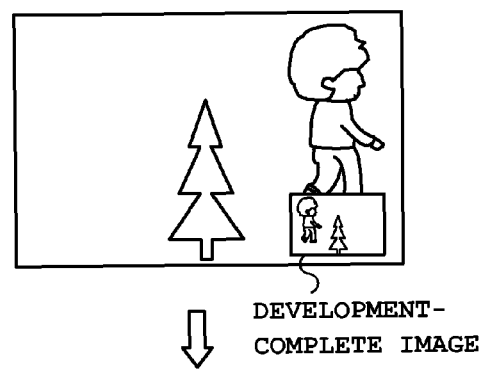
Figure 5D:
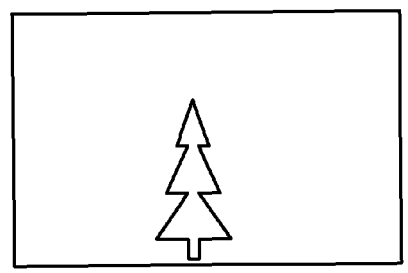

Then, the development-complete image is caused to be at rest on a lower-right portion of the monitor screen for a predetermined time (for example, eight seconds), and then gradually deleted by being sequentially slid to move downward on the monitor screen. In this manner, the control section 1 controls the series of animated motions of the development-complete image. FIG. 5C is a diagram showing a displayed development-complete image which is in a stationary state on a lower-right portion of the monitor screen. By being contained in a rectangular bold frame (for example, a black frame or a red frame), the development-complete image is distinguished from the live view image. FIG. 5D shows the monitor screen (live view image) in which the development-complete image has been deleted by being slid to move from the lower-right position of the monitor screen.

Figure 6B:
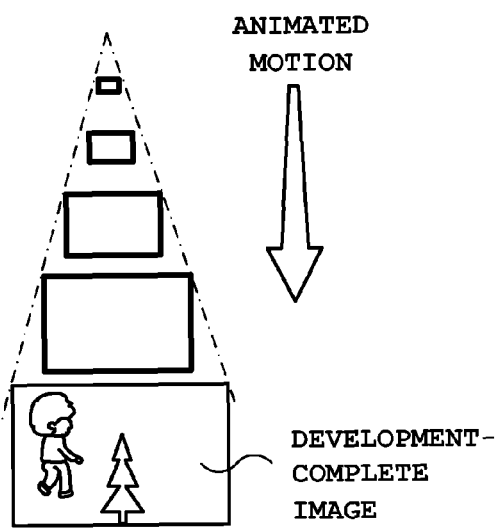

FIG. 6B is also a diagram for describing an animated motion of a development-complete image.

In this animated motion, after being caused to emerge, a development-complete image in a dot state is enlarged while its display position is being gradually moved. When reaching an area on a lower-right portion of the monitor screen, the development-complete image is caused to be at rest for a predetermined time, and then gradually deleted by being sequentially slid to move downward. In the present embodiment, one of the animated motion shown in FIG. 6A and the animated motion shown in FIG. 6B is arbitrarily select and used.

At Step A1, when the capture mode is cancelled (NO at Step A1), that is, when the current mode is switched to the replay mode, the control section 1 proceeds to replay processing (Step A18). Here, the CPU of the development processing section 6 judges, as a development processing state, whether development processing has been completed and, if the current state is a development processing standby state or development processing is being performed, judges that development processing has not been completed. Normally, when the capture mode is switched to the replay mode, the control section 1 replays an image captured immediately before this switch (last image). However, when the CPU of the development processing section 6 judges that development processing on the image captured immediately before this switch (last image) has not been completed, the control section 1 causes a character string data indicating that the current state is a development-standby state or the image is being developed to be displayed on the replay screen.

Figure 7B:
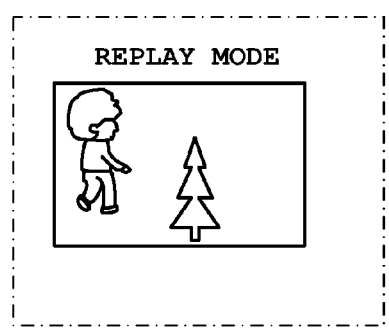
FIG. 7B shows a replay screen when a return button is operated in the replay mode.
Figure 7A:
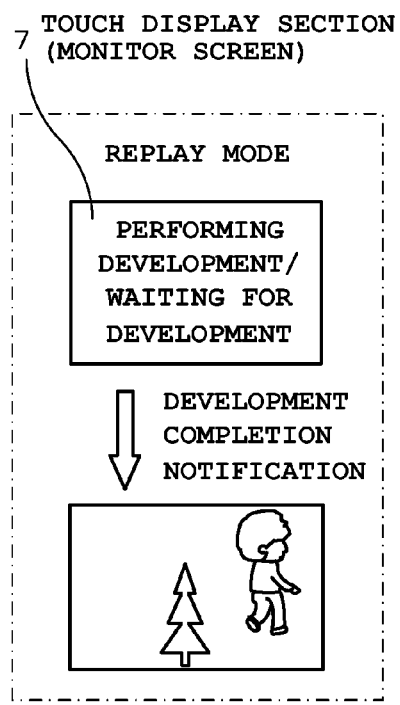
FIG. 7A shows a replay screen when a capture mode is switched to a replay mode.

FIG. 7A is a diagram showing a replay screen in a case where development processing has not been completed when the capture mode is switched to the replay mode. As shown in FIG. 7A, a character string indicating that an image is being developed or the current state is a development-standby state is displayed on this replay screen, according to the status of development processing. In this state, when a development completion notification is received from the development processing section 6, the control section 1 causes the developed image to be displayed on the replay screen by switch display in place of the character string indicating that the image is being developed or the current state is a development-standby state. FIG. 7B shows a replay screen when a return button (omitted in the drawing) is operated in the display state of FIG. 7A. Every time the return button is operated, the contents of the replay screen are switched to the preceding (immediately previously) recorded image (developed image). Also, every time a forward button is operated, the contents of the replay screen are switched to the next recorded image. In a case where a captured image to be replayed by the operation of the return button or the forward button is in a development-standby state, a character string data indicating that the captured image is in a development-standby state or is being developed is displayed on the replay screen in place of the captured image. Here, when the replay mode is cancelled (YES at Step A19), the control section 1 returns to the initial Step A1.

As described above, in the first embodiment, when an image capture instruction is made during a monitoring operation where the digital camera waits for an image capture instruction while displaying a live view image, the digital camera performs development processing on an image captured in response to the image capture instruction, and causes a development processing status to be displayed on a part of the live view image displayed by the monitoring operation being continuously performed concurrently with the development processing. Therefore, support according to the status of development processing can be achieved as image capture support for supporting appropriate image capturing. That is, when making an instruction to perform next image capturing while viewing a live view image displayed on the monitor screen, the user can, for example, make this instruction at the time of the completion of the preceding development processing, restrict the speed of continuous shooting, perform re-capturing, and finely adjust image-capture conditions, by which the full state of the buffer memory by RAW images (images waiting to be developed) can be appropriately avoided and appropriate image capturing can be performed.

Also, when development processing is completed, the control section 1 causes a development-complete image indicating that the development processing has been completed to be displayed on part of the live view image. As a result of this configuration, the user can know the timing of development completion by an image via the monitor screen.

Moreover, the control section 1 reduces a captured image that has been developed by development processing to a predetermined size, and causes the reduced image to be displayed on part of the live view image as a development-complete image. As a result of this configuration, the user can specifically know how an image of a subject has been captured regarding, for example, composition, pause, the occurrence of overexposure, and the occurrence of underexposure.

Furthermore, the control section 1 controls the display of a development-complete image such that it emerges with motion. As a result of this configuration, the user can easily check the timing of the start of the display of a development-complete image (timing of completion of development processing).

Still further, after a development-complete image is started to be displayed, the control section 1 performs the continuous display of the development-complete image until a predetermined time elapses. As a result of this configuration, the user can delete a development-complete image that is not necessary after checking how the image of the subject has been captured.

Yet still further, after a development-complete image is started to be displayed, the control section 1 controls the display of the development-complete image such that the development-complete image gradually disappears when a predetermined time elapses. As a result of this configuration, even during the period in which a development-complete image gradually disappears, the user can check how the image of the subject has been captured.

Yet still further, in the state where plural types of development processing with processing contents suitable for the respective types of capture modes according to scenes to be captured have been set, the control section 1 performs development processing of a type associated with an arbitrarily selected capture mode type from among the plural types of development processing and, when the development processing is completed, causes a development-complete image indicating that the development processing of that type has been completed to be displayed on part of the live view image. As a result of this configuration, the type of completed development can be appropriately reported.

Yet still further, the control section 1 performs special development processing for providing special effects to a captured image, reduces the captured image developed by the development processing to a predetermined size, and causes the reduced image to be displayed on part of the live view image as a development-complete image. As a result of this configuration, the user can specifically know special effects provided to a captured image by special development processing.

Yet still further, when an instruction to perform next image capturing is made during development processing, and this development processing is completed with an image captured in response to the instruction being temporarily stored in the buffer memory 3B as an image waiting to be developed, the control section 1 sequentially reads out a plurality of images waiting to be developed stored in the buffer memory 3B in chronological capture order, and performs development processing thereon. As a result of this configuration, even when image capture instructions are accepted one after another during development processing, the status of development processing can be reported in chronological capture order one by one.

Yet still further, If the current state is a state where there is an image waiting to be developed or an image being developed when the capture mode is switched to the replay mode, the control section 1 causes this state to be displayed on the replay screen. This is effective in preventing erroneous operation.

That is, if nothing is displayed when the current mode is switched to the replay mode in a development-standby state or during development, the user may erroneously regard it as an operation error, and may return the operation mode to the capture mode or press the forward button for replaying the next image. However, by displaying an indication on the replay screen which indicates that the current state is a state where there is an image waiting to be developed or an image being developed, this erroneous operation can be prevented.

In the above-described first embodiment, one type of development processing is performed on one captured image. However, plural types of different development processing with different processing contents may be performed concurrently on one captured image. For example, when an HDR (High Dynamic Range) art conversion mode for synthesizing a plurality of images having different brightness/darkness differences at high speed to obtain a picturesque image is selected as a capture mode, plural types of development processing may be performed concurrently to obtain a plurality of images having different brightness/darkness differences, and the status of the development processing for the respective images may be displayed in time series. As a result of this configuration, the user can know the status of art conversion in time series and use it as a reference for the next image capture.

Second Embodiment

A second embodiment of the present invention is described below with reference to FIG. 8A to FIG. 8G and FIG. 9 to FIG. 12.

In the above-described first embodiment, every time development processing is performed on one of a plurality of images waiting to be sequentially developed in the buffer memory 3B, an image indicating its development processing status (development-complete image) is displayed on the monitor screen by switch display. In the second embodiment, an image indicating a development processing status (a development-complete image or a development-incomplete image) is displayed in parallel on the monitor screen for each captured image. Note that components of the second embodiment which are basically identical or identical in names with those of the first embodiment are provided with the same reference numerals and descriptions therefor are omitted. In the following, the characteristic portion of the second embodiment is mainly described.

FIG. 8A to FIG. 8G are diagrams showing display examples of the monitor screen where a live view image is displayed, in which the display contents of the monitor screen when an image capture instruction is made and development processing is completed are shown in time series. FIG. 8A shows a display example when an image of a subject (a walking child) is captured as a live view image, and FIG. 8B shows a black screen (monitor screen) after an instruction to capture a first image is made. FIG. 8C shows the monitor screen immediately after the image capturing of the first image, on which a development-incomplete image generated as an image indicating that development processing on the currently captured image has not been completed is being displayed on part of the live view image. This development-incomplete image of the second embodiment is a predetermined image prepared in advance, and is structured to have a character string "WAIT" inserted in a rectangular bold frame (for example, a black frame or a red frame) and indicating that development processing has not been completed.

FIG. 8D shows a black screen (monitor screen) after an instruction to capture a second image is made, and FIG. 8E shows the monitor screen immediately after the image capturing of the second image, on which a development-incomplete image (WAIT image) indicating that development processing on the currently captured image has not been completed is being displayed on part of the live view image in parallel with the other development-incomplete image. The WAIT image at the left end in the example shown in the drawing represents the development-incomplete image for the first image capture, and the adjacent WAIT image positioned to its right side represents the development-incomplete image for the second image capture. These images are displayed in parallel on a lower-left portion of the monitor screen in the lateral direction.

FIG. 8F shows the monitor screen when development processing on the first captured image is completed. In response to the completion of the development processing, the development-incomplete image (WAIT image) of the first captured image is switched to a development-complete image. FIG. 8G shows the monitor screen when development processing on the second captured image is completed. In response to the completion of the development processing, the development-incomplete image (WAIT image) of the second captured image is switched to a development-complete image. In the example shown in FIG. 8G, the development-incomplete images of both of the first and second images have been switched to the development-complete images, which are continuously displayed for a predetermined time, as in the case of the first embodiment.

Figure 9:
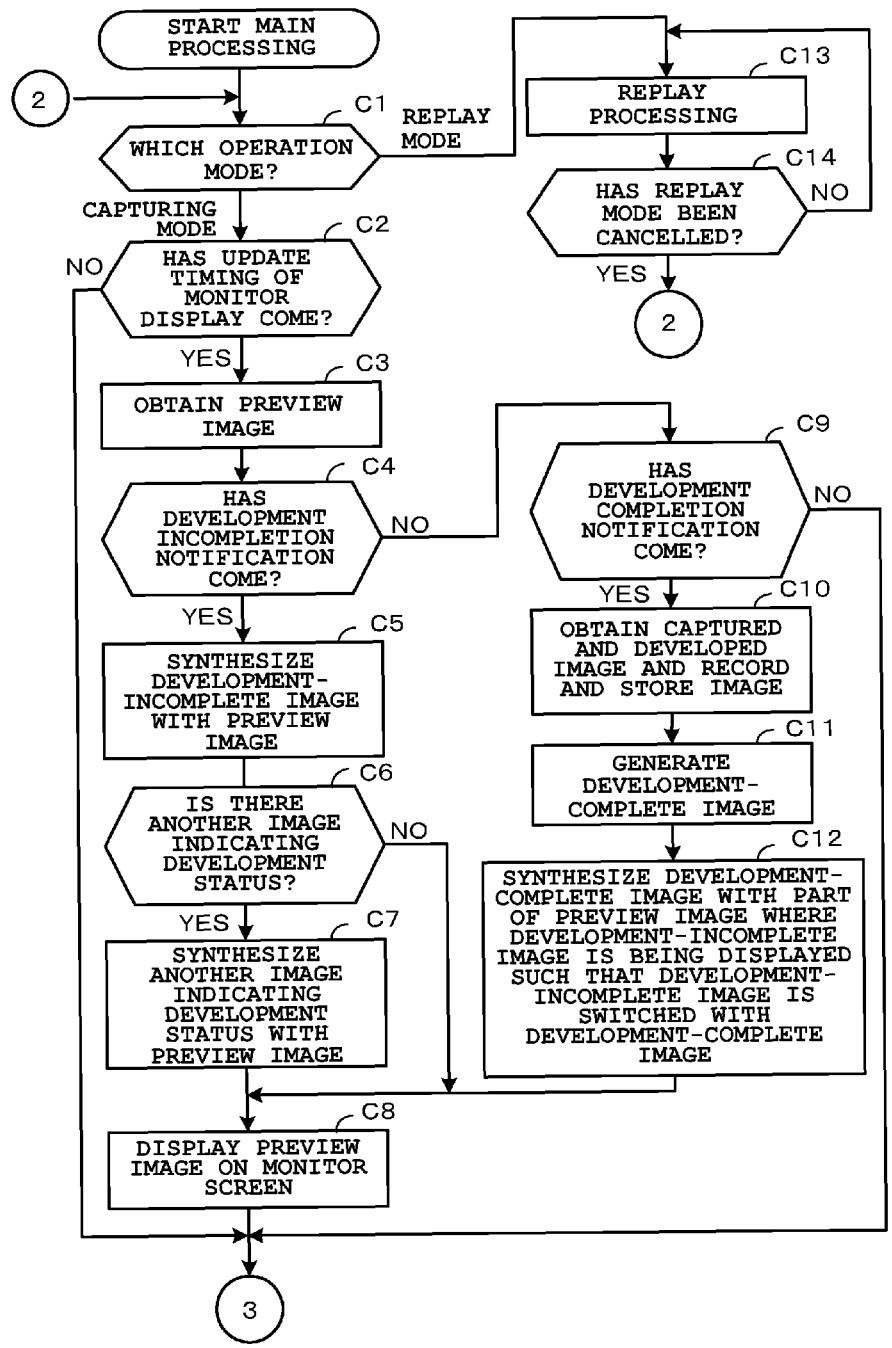
FIG. 9 is a flowchart outlining the operation of the characteristic portion in the entire operation (main processing) of a digital camera in the second embodiment.
Figure 10:
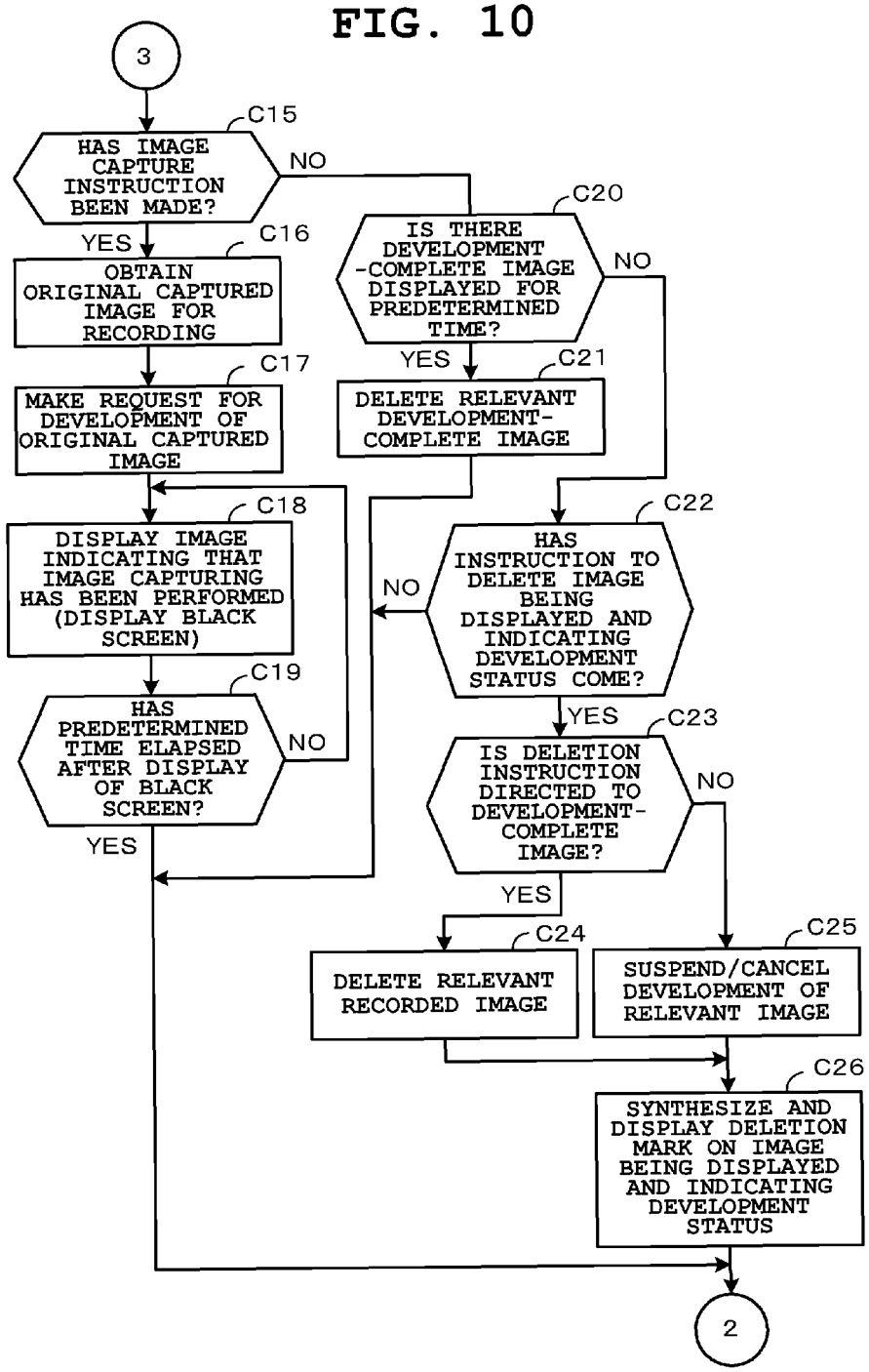
FIG. 10 is a flowchart of operations following those in FIG. 9.

FIG. 9 and FIG. 10 are flowcharts outlining the operation of the characteristic portion in the entire operation (main processing) of a digital camera in the second embodiment, which is started upon power-up. In FIG. 9 and FIG. 10, descriptions of portions similar to those of the flowchart of FIG. 3 are briefly described.

First, in the capture mode (YES at Step C1), when the update timing of monitor display is detected to have come (YES at Step C2), the control section 1 obtains a live view image from the image pickup element of the imaging section 5 (Step C3), and causes the live view image to be displayed on the touch display section 7 as a monitor screen, as shown in FIG. 8A (Step C8). Then, every time the update timing of the monitor display is detected to have come (YES at Step C2), the control section 1 judges whether an incompletion notification indicating that development processing has not been completed has been received from the development processing section 6 (Step C4) and judges whether a development completion notification has been received (Step C9).

Figure 11:
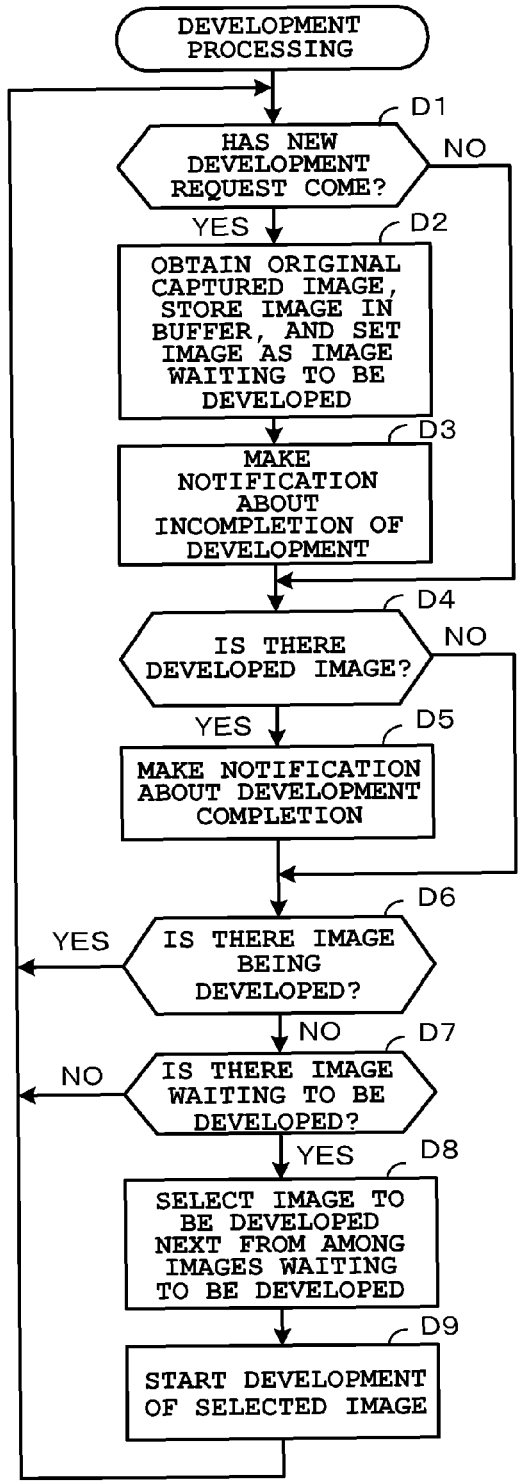
FIG. 11 is a flowchart of an operation of the development processing section 6 of the second embodiment.

FIG. 11 is a flowchart of an operation of the development processing section 6 in the second embodiment.

Note that, in FIG. 11, descriptions of portions similar to those of the flowchart of FIG. 4 are simplified.

First, when a new development request is received from the control section 1 (YES at Step D1), the CPU of the development processing section 6 causes an actual captured image for which the development request has been made to be stored in a vacant buffer in the buffer memory 3B shown in FIG. 2, sets the stored image as an image waiting to be developed (Step D2), and notifies the control section 1 of the incompletion of the development (Step D3). Then, when the current development is completed (YES at Step D4), the CPU notifies the control section 1 of the completion of the development (Step D5). Next, if no image is being developed (NO at Step D6) but there still remain images waiting to be developed (YES at Step D7), the CPU selects an image that comes next in chronological capture order as a development target (Step D8), and starts development processing on this image (Step D9).

On the other hand, when a development incompletion notification is received from the development processing section 6 (YES at Step C4 of FIG. 9), the control section 1 synthesizes a new development-incomplete image (WAIT image) with part of the live view image (for example, an area at a left-end portion) (Step C5). Then, the control section 1 judges whether another image indicating development status (a development-incomplete image or development-complete image) has been targeted for display (Step C6). When judged that another image has been targeted for display (YES at Step C6), the control section 1 synthesizes this development-incomplete image or development-complete image with part of the live view image in parallel with the above-described new development-incomplete image (Step C7). Then, the control section 1 causes the live view image including the development-incomplete image or the development-complete image to be displayed on the monitor screen (Step C8). As a result, the contents of the monitor screen such as those in FIG. 8E are displayed.

Then, when a development completion notification is received from the development processing section 6 (YES at Step C9), the control section 1 obtains the developed image from the development processing section 6, performs compression processing and the like on this original captured image, and records it in the recording medium (Step C10). Then, the control section 1 generates a development-complete image indicating that the development processing has been completed (Step C11), synthesizes the development-complete image such that it is positioned in an area of the live view image where the corresponding development-incomplete image has been displayed, in place of this development-incomplete image (Step C12), and displays it on the monitor screen (Step C8).

Then, the control section 1 judges whether the release button of the operating section 4 has been operated so as to instruct to perform image capturing (Step C15 of FIG. 10), judges whether a development-complete image displayed on the live view image for a predetermined time is present (Step C20), and judges whether an operation has been performed to instruct to delete an image (a development-incomplete image or a development-complete image) displayed on the monitor screen for indicating a development processing status (Step C22). Here, when judged that an instruction to perform image capturing has been made (YES at Step C15), as with the case of FIG. 3, the control section 1 obtains the captured image for recording (Step C16), makes a request for development of this captured image (Step C17), causes a black screen to be continuously displayed on the monitor screen for a predetermined time (Step C18), and then returns to the initial Step C1 of FIG. 9.

Figure 12:
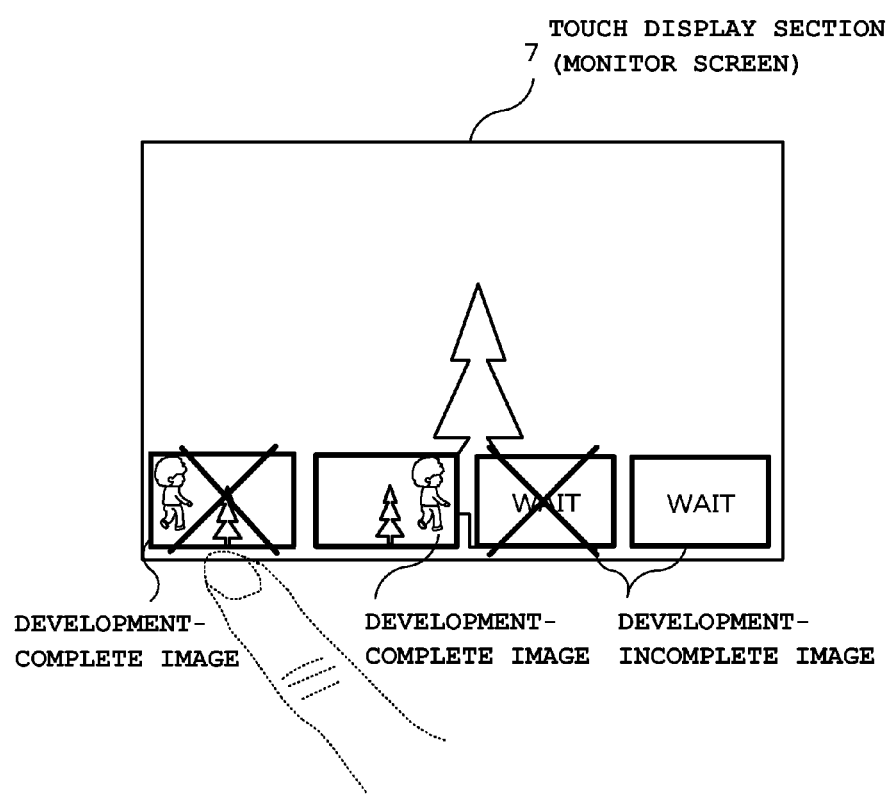
FIG. 12 is a diagram showing a state in which an operation of instructing deletion has been performed on an image that is being displayed on the monitor screen and indicating a development processing status in the second embodiment.

Also, when a development-complete image displayed on the live view image for a predetermined time is present (YES at Step C20), the control section 1 performs processing for deleting the relevant image from the monitor screen (Step C21), and then returns to the initial Step C1 of FIG. 9. Also, when an instruction is made to delete an image (a development-incomplete image or a development-complete image) displayed as part of the live view image on the monitor screen and indicating a development processing status (YES at Step C22), the control section 1 proceeds to processing for deleting this image (Step C23 to Step C26). FIG. 12 is a diagram showing the state where an operation has been performed to instruct to delete an image (a development-incomplete image or a development-complete image) indicating a development processing status.

Specifically, FIG. 12 shows a state in which, on the monitor screen where a plurality of (in the example shown in the drawings, four) images (for example, a development-incomplete images or a development-complete images) each indicating a development processing status are being displayed on part of the live view image, touch operations (for example, double tap operations) by a finger have been performed on areas where the first development-complete image the third development-incomplete image from the left are being displayed. In this case, the control section 1 recognizes that an instruction to delete the image subjected to the touch operation is made. When this operation for instructing to delete a displayed development-incomplete image or a displayed development-complete image (YES at Step C22), the control section 1 judges whether this operation is a delete instruction operation for the development-complete image (Step C23).

Here, when judged that this operation is a delete instruction operation for the development-complete image (YES at Step C23), the control section 1 deletes the relevant recorded image (the captured, developed and recorded image) from the recording medium (Step C24), and causes a delete mark (for example, x mark) to be superimposed on the image (the development-complete image) that is being displayed on the monitor screen and indicating the development processing status (Step C26). Also, when judged that this operation is a delete instruction operation for the development-incomplete image (NO at Step C23), the control section 1 suspends the development processing or cancels development based on whether the relevant captured image is being developed or waiting to be developed (Step C25), and causes a delete mark (x mark) to be superimposed on the image (the development-incomplete image) that is being displayed on the monitor screen and indicating the development processing status (Step C26). Then, the control section 1 returns to the initial Step C1 of FIG. 9.

On the other hand, when the capture mode is canceled and switched to the replay mode (Step C1 of FIG. 9), the control section 1 proceeds to replay processing (Step C13). In this case as well, when the capture mode is switched to the replay mode, if the development processing section 6 judges that development processing has not been completed, the control section 1 displays, on the replay screen, character string data indicating that the current state is a development processing standby state or the development processing is being performed, as in the case of FIG. 3.

As described above, in the second embodiment, when judged that development processing has not been completed, the control section 1 causes a development-incomplete image indicating that the development processing has not been completed (WAIT image) to be displayed on part of the live view image. As a result of this configuration, it is possible to clearly notify the user that development processing has not been completed.

Also, the development-incomplete image is a predetermined image prepared in advance (WAIT image), and therefore can be displayed immediately after image capturing, without processing for generating a development-incomplete image being performed.

Moreover, when development processing is completed for a captured image waiting to be developed or being developed, a development-complete image is displayed on part of the live view image by a development-incomplete image being switched to it. As a result of this configuration, by image switching, the timing of development completion can be reported in a manner that it is visually and easily understandable.

Furthermore, a plurality of images each indicating a development processing status are displayed in parallel on part of a live view image. As a result of this configuration, even when a plurality of images are continuously captured in a short time, the development processing status thereof can be reported at one time.

Still further, in a case where an instruction made by a user operation to delete a development-incomplete image displayed on part of a live view image on the monitor screen is to delete a captured image waiting to be developed, development processing therefor is cancelled. If the instruction is to delete a captured image being developed, the development processing is suspended. As a result of this configuration, the cancellation and suspension of development can be easily specified on the monitor screen.

Yet still further, when an instruction by a user operation is made to delete a development-complete image displayed on part of a live view image on the monitor screen, the captured and developed image recorded corresponding to that development-complete image is deleted. As a result of this configuration, the deletion of a captured, developed, and recorded image can be easily specified on the monitor screen.

In the above-described second embodiment, the WAIT image is used as a development-incomplete image prepared in advance. However, an image created in advance by a user operation and set may be used, by which an image according to the user's preference can be used as a development-incomplete image. Also, in the above-described second embodiment, the WAIT image is used as a development-incomplete image for both of an image waiting to be developed and an image being developed. However, different image contents may be used for an image waiting to be developed and an image being developed.

Third Embodiment

A third embodiment of the present invention is described below with reference to FIG. 13 to FIG. 15.

In the second embodiment described above, the predetermined image (WAIT image) prepared in advance is displayed as a development-incomplete image when a plurality of images each indicating a development processing status are displayed in parallel on part of a live view image. However, in the third embodiment, a captured image developed as a development-incomplete image is used for display. Note that components of the third embodiment that are basically identical or identical in names with those of the second embodiment are provided with the same reference numerals, and descriptions therefor are omitted. In the following descriptions, feature portions of the third embodiment are mainly described.

Figure 13:
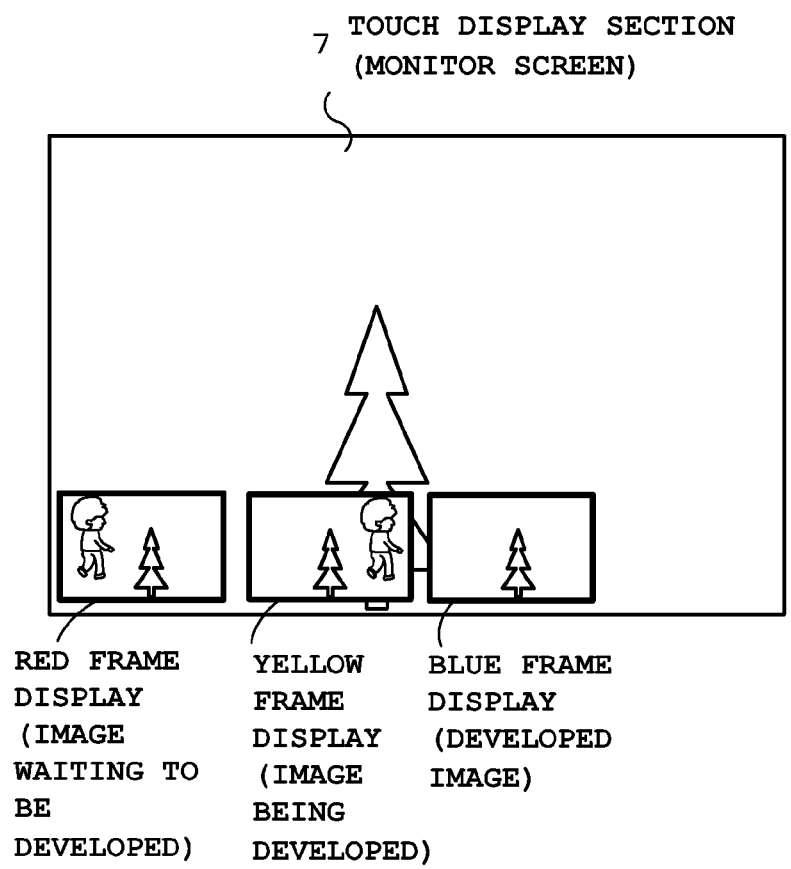
FIG. 13 is a diagram showing a monitor screen in a third embodiment, in which a plurality of images each indicating a development processing status are being displayed in parallel on part of a live view image.

FIG. 13 is a diagram showing a monitor screen where a plurality of images (development-incomplete images and development-complete images) each indicating a development processing status are being displayed in parallel on part of a live view image in the third embodiment.

The development-incomplete images of the third embodiment are reduced images (thumbnail images) each obtained by a captured image being reduced to a predetermined size (for example, approximately 1/16 size). By thumbnail images of originally captured images being developed prior to the development of these captured images, developed thumbnail images which are the development-incomplete images of the third embodiment are obtained. These development-incomplete images are classified into an image indicating a captured image waiting to be developed and an image indicating a captured image being developed, according to their development processing status. The image indicating a captured image waiting to be developed, the image indicating a captured image being developed, and the development-complete image have different colors of rectangular frames (image frames) surrounding the respective images. For example, red frame display represents the image indicating a captured image waiting to be developed, yellow frame display represents the image indicating a captured image being developed, and blue frame display represents the development-complete image.

Figure 14:
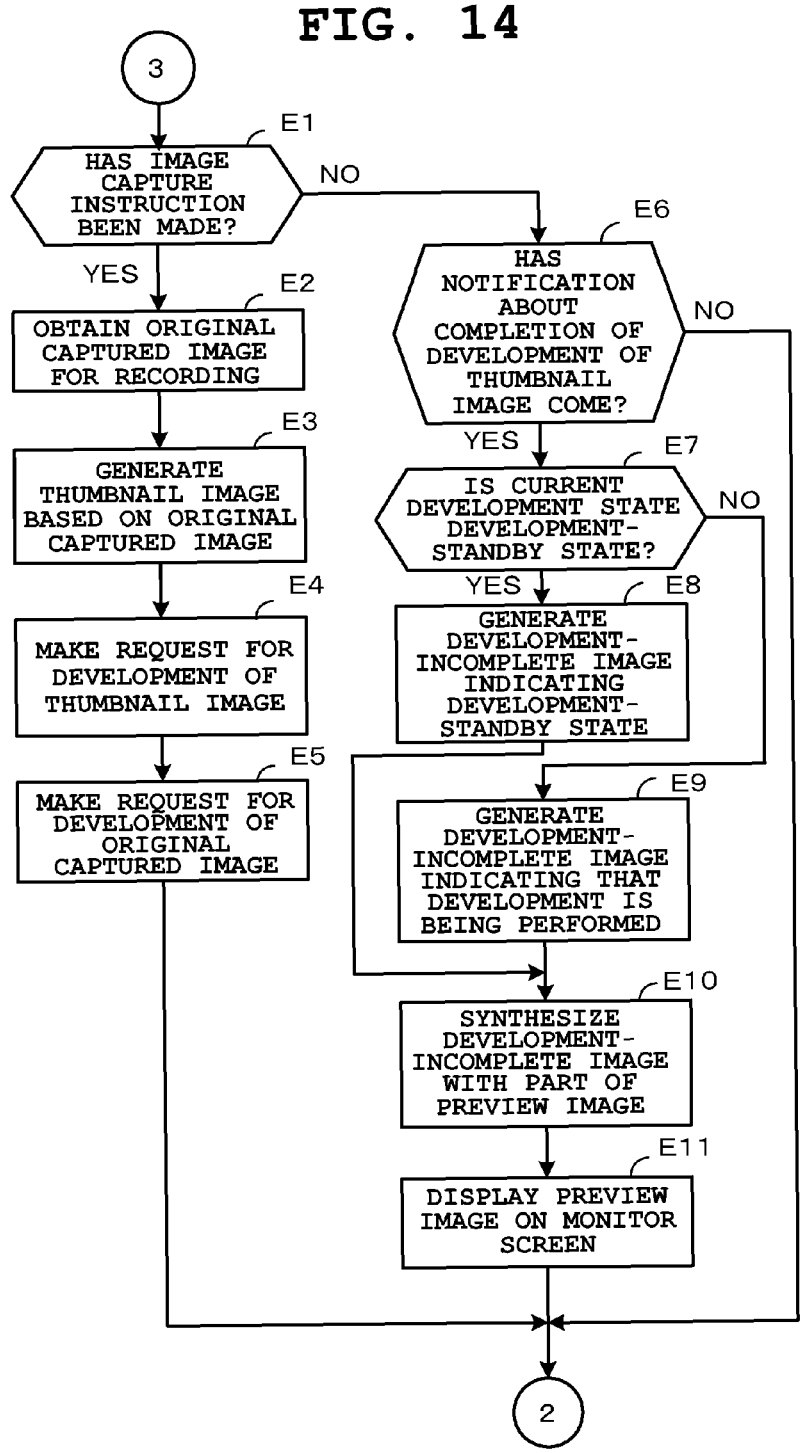
FIG. 14 is a flowchart outlining the operation of the characteristic portion of a digital camera which is performed in the third embodiment in place of that of the flowchart in FIG. 10.

FIG. 14 is a flowchart outlining the operation of the characteristic portion of the third embodiment, which is performed after the operation of FIG. 9, in place of that of the flowchart in FIG. 10 in the second embodiment. In FIG. 14, descriptions of portions similar to those of the flowchart of FIG. 10 are simplified.

When the release button of the operating section 4 is operated so as to instruct to perform image capturing (YES at Step E1), the control section 1 obtains a captured image for recording (Step E2), generates a thumbnail image (an image indicating a development processing status) based on this original captured image (Step E3), makes a request for developing the thumbnail image to the development processing section 6 (Step E4), and then makes a request for developing the original captured image (Step E5). Then, the control section 1 returns to the initial Step C1 of FIG. 9.

Figure 15:
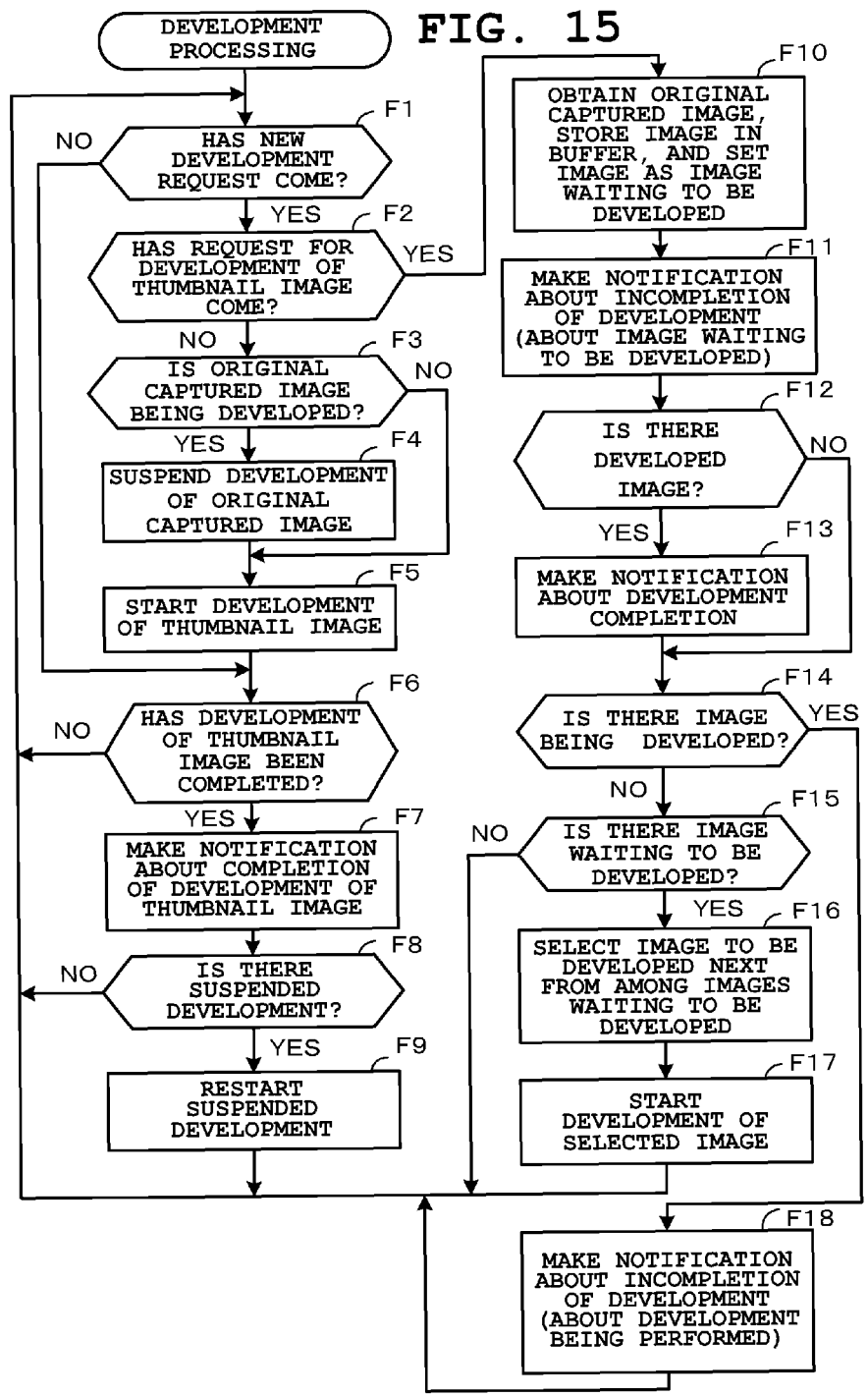
FIG. 15 is a flowchart of an operation of the development processing section 6 in the third embodiment.

FIG. 15 is a flowchart of an operation of the development processing section 6 in the third embodiment.

In FIG. 15, description of portions similar to those of the flowchart in FIG. 4 is simplified.

First, when a new development request is received from the control section 1 (YES at Step F1), and if the request is a request for developing a thumbnail image (YES at Step F2), the CPU of the development processing section 6 judges whether the original captured image is being developed (Step F3). When judged that the original captured image is being developed (YES at Step F3), the CPU suspends the development processing on the original captured image (Step F4), and starts development processing on the thumbnail image (Step F5).

Then, the CPU judges whether the development of the thumbnail image has been completed (Step F6). Here, the development has just started, and therefore the CPU returns to the initial Step F1. Then, when judged that the development of the thumbnail image has been completed (YES at Step F6), the CPU notifies the control section 1 that the development of the thumbnail image has been completed (Step F7). Then, if the original captured image whose development has been suspended due to the development of the thumbnail image is present (YES at Step F8), the CPU restarts the development of the original captured image (Step F9), and then returns to the initial Step F1.

At Step F1, when a new development request is a request for developing an original captured image (NO at Step F1), the CPU causes the original captured image for which the development request has been made to be stored in a vacant buffer in the buffer memory 3B, sets it as an image waiting to be developed (Step F10), and makes a notification about the development incompletion (about the image waiting to be developed) (Step F11), as in the case of FIG. 11. Then, when development currently being performed is completed (YES at Step F12), a notification about the development completion is made (Step F13). Here, if no image is being developed (NO at Step F14) and there still remain images waiting to be developed (NO at Step F15), the CPU selects the next image according to the capture order (Step F16), starts development processing on this image (Step F17), and then returns to the initial Step F1. At Step F14, if development processing is being performed (YES at Step F14), the CPU makes a notification about the development incompletion (notification about the development processing being performed) (Step F18), and then returns to the initial Step F1.

On the other hand, when a notification about the completion of the development of the thumbnail image is received from the development processing section 6 (YES at Step E6 of FIG. 14), and if the current development state is a development-standby state (YES at Step E7), the control section 1 generates a development-incomplete image (including a red frame) indicating a development-standby state based on the developed thumbnail image (Step E8). If development is being performed (NO at Step E7), the CPU generates a development-incomplete image (including a yellow frame) indicating that development is being performed based on the developed thumbnail image (Step E9). Then, the control section 1 synthesizes this development-incomplete image indicating a development-standby state or indicating that development is being performed with part of the preview image (Step E10) and displays it on the monitor screen (Step E11). Then, the control section 1 returns to the initial Step C1 of FIG. 9.

At Step C9, when a development completion notification is received from the development processing section 6 (YES at Step C9 of FIG. 9), the control section 1 obtains the developed image from the development processing section 6, performs compression processing and the like on this original captured image, and records it in the recording medium (Step C10). Then, the control section 1 generates a development-complete image indicating that the development processing has been completed (Step C11), and synthesizes the development-complete image such that it is positioned in an area of the live view image where the corresponding development-incomplete image has been displayed, in place of this development-incomplete image (Step C12), and displays it on the monitor screen (Step C8).

As described above, the development-incomplete image of the third embodiment, which is displayed on part of a live view image, is a developed thumbnail image obtained by an original image captured in response to a capture instruction being reduced and developed. This developed thumbnail image is displayed as a development-incomplete image on part of a live view image. As a result of this configuration, the user can check how an image of a subject has been captured even when its development has not been completed. That is, because the development of a thumbnail image ends earlier, by its size, than the development of the original captured image, how the subject image has been captured can be quickly checked by this amount of time.

Also, the control section 1 causes the development-complete image indicating that development processing has been completed, the image indicating a development processing standby state, and the image indicating that development processing is being performed to be displayed in parallel on part of a live view image such that they are identifiable. As a result of this configuration, the user can check how an image of a subject has been captured even when its development has not been completed. In addition, the user can know, when a plurality of images are continuously captured at high speed, the development processing status of these captured images at one time.

In the above-described third embodiment, when a request for developing a thumbnail image is received while the development of the original captured image is being developed, the development processing section 6 suspends this development and starts the development of the thumbnail image. However, the development of the thumbnail image may be started after the development of the original captured image is completed.

Although not particularly mentioned in the above-described third embodiment, a configuration may be adopted in which the contents of development processing on an original captured image and the contents of development processing on its thumbnail image are not identical to each other, and simplified development processing is performed on the thumbnail image. By this configuration, the development of a thumbnail image can be completed more quickly.

Also, in each of the above-described embodiments, an image indicating a development processing status is synthesized with part of a live view image and displayed. However, in a case where the display area of the live view image is smaller than the size of the monitor screen, the image indicating a development processing status may be displayed on an area excluding the display area of the live view image, such as the lower end area or the left end area of the monitor screen, together with the live view image.

Moreover, in each of the above-described embodiments, the present invention is applied to a camera as an imaging apparatus. However, the present invention is not limited thereto, and can be applied to, for example, camera-function-equipped smartphones (multifunctional portable telephones), tablet PCs (Personal Computers), notebook PCs, PDAs (Personal Data Assistants: portable information terminals), and music players.

The "devices" or the "sections" described in the above-described embodiments are not required to be in a single housing and may be separated into a plurality of housings by function. In addition, the steps in the above-described flowcharts are not required to be processed in time-series, and may be processed in parallel, or individually and independently.

While the present invention has been described with reference to the preferred embodiments, it is intended that the invention be not limited by any of the details of the description therein but includes all the embodiments which fall within the scope of the appended claims.

The invention claimed is:

1. An imaging apparatus comprising:
   a monitoring section which performs a monitoring operation of waiting for an image capture instruction while causing a live view image to be displayed;
   a development section which starts development processing for generating a recording image for recording from a RAW image captured by an image pickup element when an instruction to perform image capturing is made while the monitoring operation is being performed, and continuously performs the development processing concurrently with the monitoring operation;
   a recording section which records the recording image obtained by the development processing after the development processing performed by the development section concurrently with the monitoring operation is completed;
   a judgment section which judges a processing status of the development processing being performed by the development section while the monitoring operation is being performed; and
   a display control section which causes the processing status of the development processing judged by the judgment section to be displayed together with the live view image while the monitoring operation is being performed,
   wherein the judgment section sequentially judges whether the development processing being performed by the development section has been completed while the monitoring operation is being performed, and
   wherein the display control section:
      starts display of a development-complete image indicating that the development processing has been completed together with the live view image, at a timing at which the development processing is judged to have been completed by the judgment section;
      continues the display of the development-complete image until a predetermined time elapses after the development-complete image is started to be displayed; and
      controls the display of the development-complete image such that the development-complete image gradually disappears when the predetermined time has elapsed.

2. The imaging apparatus according to claim 1, wherein the monitoring operation includes live view display processing for generating a live view image for display from a RAW image obtained by sequential image capturing by the image pickup element and causing the live view image to be displayed on a display section by sequential display, and image-capture instruction judgment processing for sequentially judging whether an image capture instruction has been made while the live view display processing is being performed,
   wherein the development section starts the development processing for generating a recording image for recording from a RAW image captured by the image pickup element, when an image capture instruction is judged to have been made by the image-capture instruction judgment processing, and
   wherein the image-capture instruction judgment processing is performed continuously while the development processing is being performed by the development section.

3. The imaging apparatus according to claim 2, wherein the development section sets a RAW image newly captured by the image pickup element as an image waiting to be developed, when a new image capture instruction is judged to have been made by the image-capture instruction judgment processing while the development processing is being performed by the development section, and starts development processing for the RAW image waiting to be developed after the development processing currently being performed is completed.

4. The imaging apparatus according to claim 1, wherein the display control section reduces a developed image obtained by completion of the development processing to a predetermined size, and causes the reduced image to be displayed as the development-complete image together with the live view image.

5. The imaging apparatus according to claim 3, wherein the image-capture instruction judgment processing is continuously performed even while the processing status of the development processing is being displayed by the display control section, and
   wherein the development section starts, when an image capture instruction is judged to have been made by the image-capture instruction judgment processing, development processing for a RAW image newly captured by the image pickup element even while the processing status of the development processing is being displayed by the display control section.

6. The imaging apparatus according to claim 4, wherein the display control section controls display of the development-complete image such that the development-complete image emerges with motion.

7. The imaging apparatus according to claim 1, further comprising:
   a selection section which selects development processing of an arbitrary type as a subject to be processed, from among plural types of different development processing with different processing contents,
   wherein the display control section causes the development-complete image indicating that the development processing of the type selected by the selection section has been completed to be displayed together with the live view image, at the timing at which the development processing is judged to have been completed by the judgment section.

8. The imaging apparatus according to claim 1, wherein the development section performs plural types of development processing with different processing contents on one captured image, and
   wherein the display control section causes a development processing status which is judged by the judgment section to be displayed for each of the plural types of development processing performed by the development section, together with the live view image.

9. The imaging apparatus according to claim 1, wherein the display control section causes a development processing status to be displayed for each of a plurality of captured images in parallel with the live view image.

10. The imaging apparatus according to claim 1, further comprising:
    a recording control section which deletes a captured and developed image that has been recorded and corresponds to the development-complete image when an instruction to delete the development-complete image is made by a user operation with the development-complete image being displayed together with the live view image.

11. An imaging apparatus comprising:
a monitoring section which performs a monitoring operation of waiting for an image capture instruction while causing a live view image to be displayed;
a development section which starts development processing for generating a recording image for recording from a RAW image captured by an image pickup element when an instruction to perform image capturing is made while the monitoring operation is being performed, and continuously performs the development processing concurrently with the monitoring operation;
a recording section which records the recording image obtained by the development processing after the development processing performed by the development section concurrently with the monitoring operation is completed;
a judgment section which judges a processing status of the development processing being performed by the development section while the monitoring operation is being performed;
a display control section which causes the processing status of the development processing judged by the judgment section to be displayed together with the live view image while the monitoring operation is being performed; and
a temporary storage section which temporarily stores, as an image waiting to be developed by development processing by the development section, an image captured in response to an instruction to perform a next image capturing made during the development processing by the development section,
wherein the development section sequentially reads out a plurality of images stored in the temporary storage section and waiting to be developed in chronological capture order, and performs development processing, when the development processing currently being performed is completed in a state where the plurality of images waiting to be developed have been stored in the temporary storage section, and
wherein development-complete images are sequentially displayed with the live view image by being switched every time the judgment section judges that development processing for an image waiting to be developed is completed.

12. The imaging apparatus according to claim 11, wherein the judgment section judges whether a current state is a state of waiting for development processing to be started, a state where development processing is being performed, or a state where development processing has been completed, as a development processing status, and
wherein the display control section causes, when the judgment section judges that the current state is the state of waiting for development processing to be started or the state where development processing is being performed, a development-incomplete image indicating that the development processing has not been completed to be displayed together with the live view image.

13. The imaging apparatus according to claim 12, further comprising:
a development control section which, when an instruction to delete the development-incomplete image is made by a user operation with the development-incomplete image being displayed together with the live view image, cancels development processing if the instruction is an instruction to delete a captured image waiting to be developed by the development processing, or suspends development processing if the instruction is an instruction to delete a captured image whose development processing is being performed.

14. The imaging apparatus according to claim 12, wherein the display control section causes an image indicating the state of waiting for development processing to be started and an image indicating the state where development processing is being performed to be displayed in a distinguishable manner.

15. An imaging apparatus comprising:
a monitoring section which performs a monitoring operation of waiting for an image capture instruction while causing a live view image to be displayed;
a development section which starts development processing for generating a recording image for recording from a RAW image captured by an image pickup element when an instruction to perform image capturing is made while the monitoring operation is being performed, and continuously performs the development processing concurrently with the monitoring operation;
a recording section which records the recording image obtained by the development processing after the development processing performed by the development section concurrently with the monitoring operation is completed;
a judgment section which judges a processing status of the development processing being performed by the development section while the monitoring operation is being performed; and
a display control section which causes the processing status of the development processing judged by the judgment section to be displayed together with the live view image while the monitoring operation is being performed,
wherein the judgment section, when judging whether the development processing has been completed as a development processing status, judges that the development processing has not been completed if the current state is a state of waiting for development processing to be started or if the development processing is being performed, and
wherein the imaging apparatus further comprises:
a mode switching section which switches between a capture mode for image capturing and a replay mode for image playback; and
a replay section which causes information indicating that the current state is the state of waiting for development processing to be started or information indicating that the current state is the state where the development processing is being performed to be displayed on a replay screen, if the judgment section judges that the development processing has not been completed when the capture mode is switched to the replay mode by the mode switching section.

16. An imaging method comprising:
performing a monitoring operation of waiting for an image capture instruction while causing a live view image to be displayed;
starting development processing for generating a recording image for recording from a RAW image captured by an image pickup element when an instruction to perform image capturing is made while the monitoring operation is being performed, and continuously performing the development processing concurrently with the monitoring operation;

recording the recording image obtained by the development processing after the development processing performed concurrently with the monitoring operation is completed;

judging a processing status of the development processing being performed while the monitoring operation is being performed;

causing the judged processing status of the development processing to be displayed together with the live view image while the monitoring operation is being performed; and temporarily storing, in a temporary storage section, as an image waiting to be developed by development processing, an image captured in response to an instruction to perform a next image capturing made during the development processing, wherein a plurality of images stored in the temporary storage section and waiting to be developed are sequentially read out in chronological capture order, and development processing is performed, when the development processing currently being performed is completed in a state where the plurality of images waiting to be developed have been stored in the temporary storage section, and wherein development-complete images are sequentially displayed with the live view image by being switched every time it is judged that development processing for an image waiting to be developed is completed.

17. A non-transitory computer-readable storage medium having stored thereon a program that is executable by a computer, the program being executable by the computer to perform functions comprising:

monitoring processing for performing a monitoring operation of waiting for an image capture instruction while causing a live view image to be displayed;

development control processing for starting development processing for generating a recording image for recording from a RAW image captured by an image pickup element when an instruction to perform image capturing is made while the monitoring operation is being performed, and continuously performing the development processing concurrently with the monitoring operation;

recording processing for recording the recording image obtained by the development processing after the development processing performed by the development control processing concurrently with the monitoring operation is completed;

judgment processing for judging a processing status of the development processing being performed by the development control processing while the monitoring operation is being performed;

display control processing for causing the processing status of the development processing judged by the judgment processing to be displayed together with the live view image while the monitoring operation is being performed; and temporary storage processing for temporarily storing, in a temporary storage section, as an image waiting to be developed by development processing, an image captured in response to an instruction to perform a next image capturing made during the development processing, wherein a plurality of images stored in the temporary storage section and waiting to be developed are sequentially read out in chronological capture order, and development processing is performed, when the development processing currently being performed is completed in a state where the plurality of images waiting to be developed have been stored in the temporary storage section, and wherein development-complete images are sequentially displayed with the live view image by being switched every time it is judged that development processing for an image waiting to be developed is completed.

18. An imaging apparatus comprising:

a monitoring section which performs a monitoring operation of waiting for an image capture instruction while causing a live view image to be displayed;

a development section which starts development processing for generating a recording image for recording from a RAW image captured by an image pickup element when an instruction to perform image capturing is made while the monitoring operation is being performed, and continuously performs the development processing concurrently with the monitoring operation, and, even while the development processing is being performed, starts development processing for a next RAW image when an instruction to perform a next image capturing is made;

a recording section which records the recording image obtained by the development processing after the development processing performed by the development section concurrently with the monitoring operation is completed;

a judgment section which judges a processing status of the development processing being performed by the development section while the monitoring operation is being performed; and a display control section which causes the processing status of the development processing judged by the judgment section to be displayed together with the live view image while the monitoring operation is being performed, and, even while the processing status of the development processing is being displayed, starts development processing for a next RAW image when an instruction to perform next image capturing is made.

* * * * *